(12) United States Patent
Stacey et al.

(10) Patent No.: US 9,829,636 B2
(45) Date of Patent: Nov. 28, 2017

(54) ALIGNMENT OF RADIATION BEAMS

(71) Applicant: BAE SYSTEMS plc, London (GB)

(72) Inventors: Craig Daniel Stacey, Bristol (GB); Christopher Stace, Bristol (GB)

(73) Assignee: BAE SYSTEM plc, London (GB)

( * ) Notice: Subject to any disclaimer, the term of this patent is extended or adjusted under 35 U.S.C. 154(b) by 104 days.

(21) Appl. No.: 14/784,761

(22) PCT Filed: Apr. 15, 2014

(86) PCT No.: PCT/GB2014/051180
§ 371 (c)(1),
(2) Date: Oct. 15, 2015

(87) PCT Pub. No.: WO2014/170665
PCT Pub. Date: Oct. 23, 2014

(65) Prior Publication Data
US 2016/0062059 A1 Mar. 3, 2016

(30) Foreign Application Priority Data

Apr. 17, 2013 (EP) ..................................... 13275091
Apr. 17, 2013 (GB) .................................. 1306936.4

(51) Int. Cl.
*G02B 6/28* (2006.01)
*G02B 6/38* (2006.01)
(Continued)

(52) U.S. Cl.
CPC ......... *G02B 6/2938* (2013.01); *G02B 6/2931* (2013.01); *G02B 6/29373* (2013.01);
(Continued)

(58) Field of Classification Search
CPC .. G02B 6/2931; G02B 6/29373; G02B 6/325; G02B 6/3636; G02B 6/3829;
(Continued)

(56) References Cited

U.S. PATENT DOCUMENTS 6,411,424 B1   6/2002 Raj
6,591,040 B1 * 7/2003 Dempewolf ......... G02B 6/2931
                                                                        385/24
(Continued)

FOREIGN PATENT DOCUMENTS

WO       2014170665 A1    10/2014

OTHER PUBLICATIONS

International Preliminary Report on Patentability received for Patent Application No. PCT/GB2014/051180, dated Oct. 29, 2015. 9 pages.

(Continued)

*Primary Examiner* — Akm Enayet Ullah
*Assistant Examiner* — Michael Mooney
(74) *Attorney, Agent, or Firm* — Finch & Maloney PLLC

(57) ABSTRACT

Apparatus and method are disclosed for co-aligning a number of laterally displaced radiation beams from respective radiation source outputs, each beam having a respective waveband. The apparatus comprises a collimating element for receiving each of said radiation beams with respective lateral displacements and a combining element for receiving each of said radiation beams passed by said collimating element. The apparatus further comprises a radiation source mount for positioning the radiation source outputs relative to the collimating element. The method comprises longitudinally positioning the radiation source outputs upon the mount, relative to the collimating element, in dependence upon the waveband of each beam, to cause the radiation beams passed by the combining element to be co-aligned.

17 Claims, 5 Drawing Sheets

(51) Int. Cl.
- *G02B 6/42* (2006.01)
- *G02B 27/30* (2006.01)
- *G02B 27/10* (2006.01)
- *G02B 6/293* (2006.01)
- *G02B 6/36* (2006.01)

(52) U.S. Cl.
CPC ........... *G02B 6/3636* (2013.01); *G02B 6/423* (2013.01); *G02B 6/4243* (2013.01); *G02B 27/1006* (2013.01); *G02B 27/1073* (2013.01); *G02B 27/1086* (2013.01); *G02B 27/30* (2013.01)

(58) Field of Classification Search
CPC .. G02B 6/3839; G02B 6/3822; G02B 6/3885; G02B 6/4206; G02B 6/4208; G02B 6/4214; G02B 6/4243; G02B 6/4246; G02B 6/423; G02B 27/1006; G02B 27/1073; G02B 27/1086; G02B 27/30
USPC ..... 385/24, 27, 33, 37, 39, 47, 51.52, 88–94
See application file for complete search history.

(56) References Cited

U.S. PATENT DOCUMENTS

2004/0125427 A1   7/2004  Shim
2017/0146399 A1*  5/2017  Brady ................. G01J 3/10

OTHER PUBLICATIONS

International Search Report and Written Opinion received for Patent Application No. PCT/GB2014/051180, dated May 27, 2014. 13 pages.
GB Intellectual Property Office Search Report under Section 17(5) received for GB Patent Application No. 1306936.4 dated Sep. 19, 2013. 3 pages.
EP Intellectual Property Office Extended Search Report received for EP Patent Application No. 13275091.0 dated Sep. 24, 2013. 9 pages.
Bochove, Erik J., "Theory of Spectral Beam Combining of Fiber Lasers," IEEE Journal of Quantum Electronics, vol. 38, No. 5. May 1, 2002. pp. 432-445.
Tso Yee Fan, et al., "Laser Beam Combining for Power and Brightness Scaling," IEEE Aerospace Conference Proceedings, vol. 3. Mar. 18-25, 2000. pp. 49-54.

* cited by examiner (a)

(b)

ALIGNMENT OF RADIATION BEAMS

The present invention relates to an apparatus and method for aligning radiation beams, in particular a number of laterally displaced radiation beams. Further in particular, but not exclusively, the present invention relates to apparatus and methods for handling multiple laser beams, typically over extended wave ranges.

There is often a need to combine and co-align lasers of different wavelengths, for example in remote spectroscopy or in optical communication. The traditional way of combining and co-aligning is to use dichroic mirrors, which when aligned correctly reflect certain wavelengths and transmit other wavelengths, depending on the design of the dichroic. However, as the number of wavelengths to be combined and the spectral range of these wavelengths increase, the more complex the design of the dichroic becomes, and the more dichroic mirrors themselves are potentially needed. This problem is compounded by the alignment tolerances of each dichroic and the escalating cost as additional wavelengths are introduced.

An alternative solution is spectral beam combining (SBC). In this approach, the radiation from a number of spatially separated laser sources is collected and collimated by a common optic (or mirror), which translates spatial separation in the lens/mirror focal plane (i.e., at the laser sources) into angular separation in the image plane. A diffractive optical element (DOE) such as a diffraction grating is then placed following the lens/mirror, upon which the different wavelength beams are incident at different angles. The DOE is arranged to deflect/reflect the angularly separated beams from the lens/mirror, caused by the spatial separation of the input beams, and combine the input beams so that they become co-aligned.

Diffraction gratings are typically used as they offer comparatively high spectral dispersion, thus allowing closely spaced wavelengths to be combined, although only a limited spectral bandwidth may be accommodated before overlap of diffraction orders becomes a problem. An alternative to the diffraction grating is a prism. Such a device performs the same function, exhibiting much lower spectral dispersion, but offering a much wider spectral bandwidth. There are applications which require broad spectral bandwidths however, for example, spectroscopy, flow cytometry, free-space optical communications. SBC for such applications may then require the use of a prism as the dispersive element.

The angular separation of the input beams incident upon the diffraction grating or prism is dependent on the lateral separation of the lasers from the optical axis of the lens and the wavelength of the laser beam. Accordingly, the lateral separation and wavelength are typically selected for a specific lens and diffractive optical element arrangement, so that the beams deflected/reflected from the diffractive optical element become combined and co-aligned.

However, it is found that the spectral range of wavelengths associated with the laser beams incident upon the lens results in a deviation of the required combined beam divergence emerging from the diffractive optical element.

SUMMARY OF THE INVENTION

In accordance with a first aspect of the present invention, there is provided apparatus for co-aligning a number of laterally displaced radiation beams from a respective radiation source output, each beam having a respective waveband, the apparatus comprising:

a collimating element for receiving each of said radiation beams with respective lateral displacements;

a combining element for receiving each of said radiation beams passed by said collimating element; and, a radiation source mount for positioning the radiation source outputs relative to the collimating element, wherein the radiation source outputs are longitudinally positionable upon the mount relative to the collimating element in dependence upon the waveband of each beam to cause the radiation beams passed by the combining element to be co-aligned.

Advantageously, the ability to longitudinally space the radiation source outputs separately, relative to the collimator element, namely parallel to the optical axis of the collimator element, permits the radiation source to be positioned at the correct focal length of the collimator element for the respective radiation waveband. The ability to position the radiation sources parallel to the optical axis also aids correction of geometric aberrations caused by the collimating and diffractive elements. For example, it is known that lenses impose spherical aberrations on the beam and as such it is found that a particular radiation source output position produces a better quality beam by being adjusted slightly (along the optical axis) from the point corresponding to the theoretical focal length.

Referring to FIG. 1 of the drawings, there is illustrated a schematic illustration of a known beam combining arrangement 1 in which the output of three fibre lasers 2, 3, 4 arranged to generate lasing radiation at different wavelengths[,] are arranged in a single focal plane with respect to a lens 5. However, the difference in focal length of the lens, arranged to receive laser radiation at 355 nm and 1908 nm is found to be approximately 4 mm. Accordingly, having these fibre laser outputs 2, 3, 4 in a single focal plane in front of the lens 4 is found to correspond to a de-focus of one or all of the wavelengths, and hence a deviation from the required beam divergence of the combined beam emerging from the combining element 6.

In an embodiment according to the invention, the radiation source mount is arranged to support a number of waveguides, each being arranged to guide radiation from a respective radiation source, such as a diode laser, and comprises a number of longitudinal channels disposed therein for separately receiving waveguides, such as optical fibres.

The channels are orientated substantially parallel to each other and to an optical axis of the collimator element. The relative lateral separation of the channels within the mount from the optical axis of the collimator is preferably selected according to the waveband of the respective radiation source for the particular collimator/combining element arrangement. This provides for an array of waveguides, laterally displaced with respect to each other, the output of each guide being longitudinally spaced from the collimator by a distance corresponding to the focal length of the collimator for the particular waveband supported by the respective waveguide. It is found that the greater the spectral range of the associated radiation sources, the greater is the disparity between focal lengths of each wavelength, and hence the required longitudinal positions (along the optical axis) of the output of the waveguides.

The radiation source mount preferably further comprises a clamp for clamping the waveguides within the respective channels.

The collimator element may comprise a lens or a lens arrangement and the combining element may comprise a diffraction grating or a prism.

In a further embodiment, the mount beneficially comprises a translation stage for longitudinally displacing the radiation source outputs along the optical axis, such as moving the output of the waveguides along the respective channel of the mount, to vary the separation of the output of the waveguide from the collimator element.

In accordance with the present invention as seen from a second aspect, there is provided a method of co-aligning a number of laterally displaced radiation beams output from respective radiation sources, each beam having a respective waveband, the method comprising:

longitudinally positioning the outputs of the radiation sources upon a mount relative to the collimating element, in dependence upon the waveband of the respective beam, collimating the radiation beams output from the radiation sources at a collimating element, and combining the collimated radiation beams at a combining element such that the radiation beams passed by the combining element become co-aligned.

The method may further comprise fixing the position of the output of the radiation sources once the beams passed by the combining element become co-aligned.

Embodiments of the present invention will now be described by way of example only and with reference to the accompanying drawings, in which.

Figure 4:
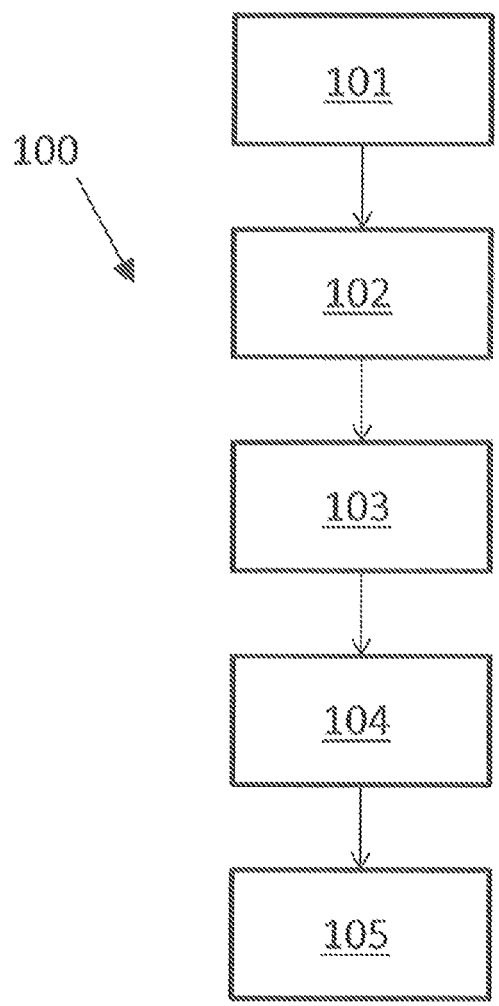
Figure 5:
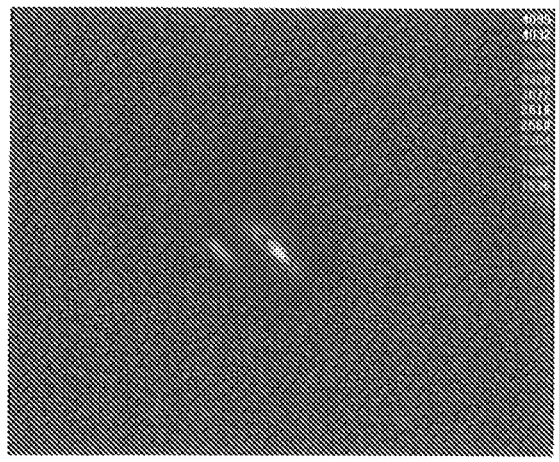
Figure 5:
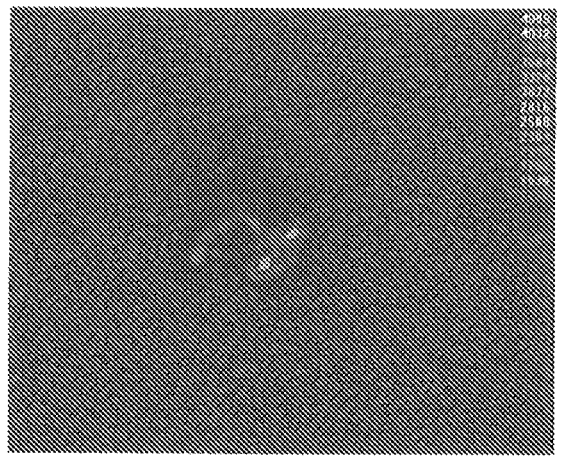

FIG. 4 is a schematic illustration of the steps associated with a method of co-aligning a number of laterally displaced radiation beams according to [an embodiment of] the present invention; and, FIG. 5 is a far-field beam profile of 355 nm wavelength radiation with (a) the output of the waveguide at the correct focal length and (b) the output of the waveguide longitudinally displaced from the focal point by 300 μm.

Figure 1:
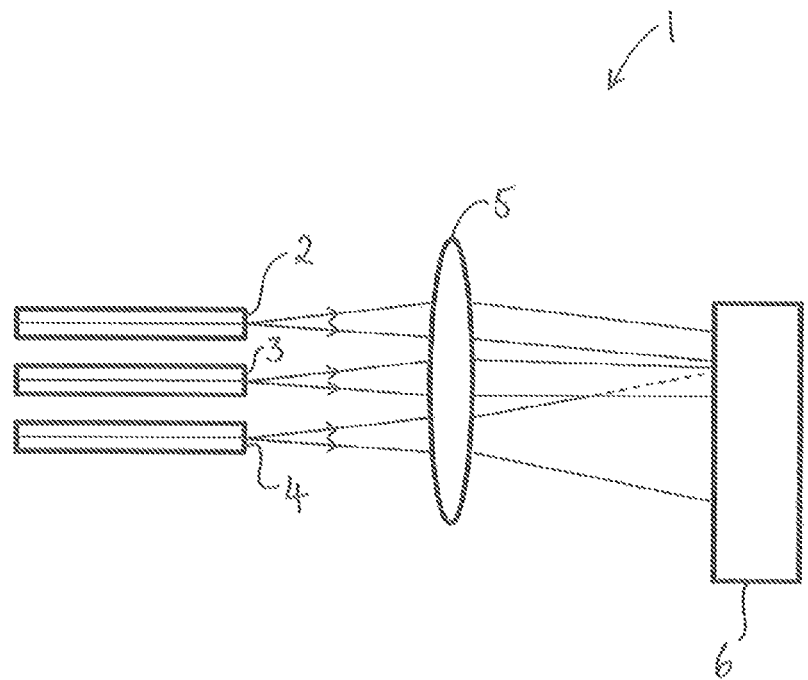
FIG. 1 is a schematic illustration of a known apparatus for combining radiation beams.
Figure 2:
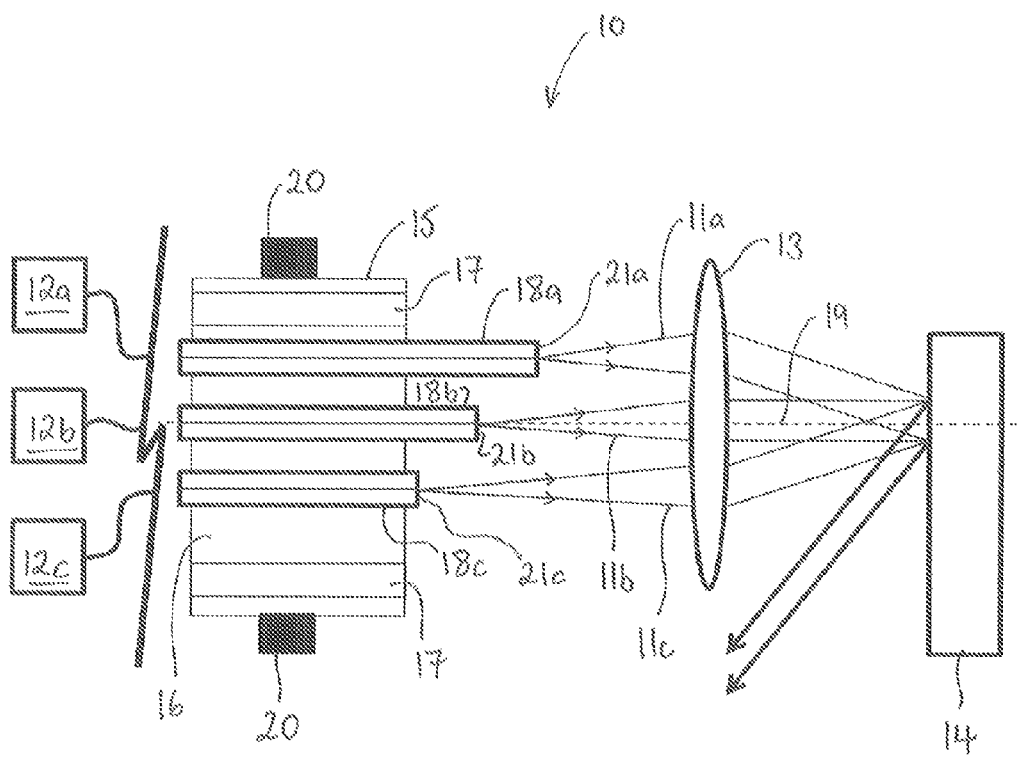
FIG. 2 is schematic illustration of the apparatus for co-aligning a number of laterally displaced radiation beams according to the present invention.

Referring to FIG. 2 of the drawings, there is shown an apparatus 10 for co-aligning radiation beams 11a-c output from respective radiation sources 12a-c, according to the present invention. The apparatus 10 comprises a collimator element 13, such as a lens or lens arrangement, which is arranged to receive the radiation beams 11a-c from the radiation sources 12a-c, and a combining element 14, such as a diffraction grating or prism, for combining the collimated beams incident thereon from the collimator element 13.

Figure 3:
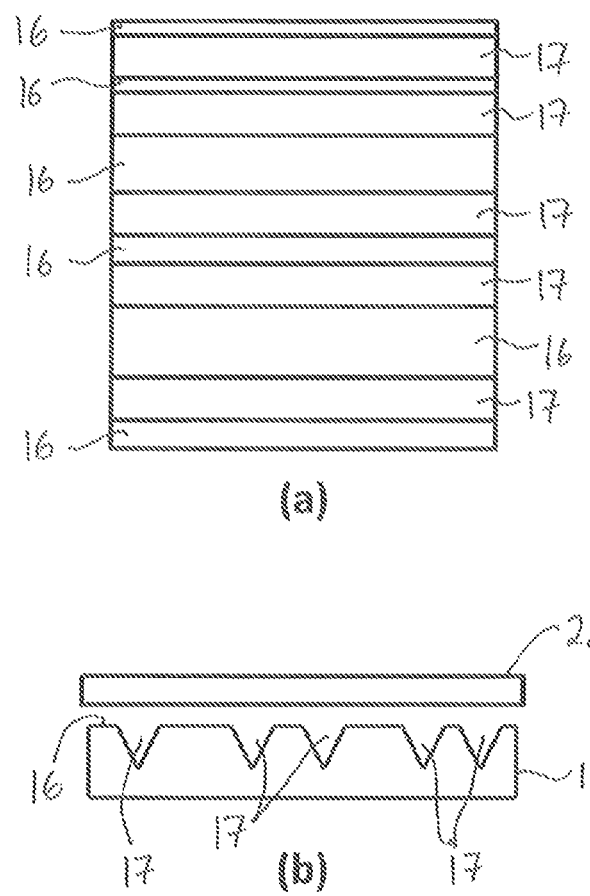
FIG. 3a is a plan view of the radiation source mount with the waveguides removed therefrom.
FIG. 3b is a front view of the radiation source mount and lid.

The apparatus 10 further comprises a radiation source mount 15, as illustrated in FIG. 3, for supporting the output of the radiation sources 12a-c in spaced relation to the collimator element 13. The mount 15 comprises a planar surface 16 having a number of V-shaped channels 17 formed therein. Each channel 17 separately supports a waveguide, such as an optical fibre 18, which is arranged to guide radiation, such as lasing radiation, from a respective radiation source 12a-c. Each channel 17 is arranged to extend substantially parallel to the optical axis 19 of the collimator element 13. The wavebands of the radiation output from the radiation sources 12a-c typically comprise separated, non-overlapping, spectra and the lateral separation of the channels 17 from the optical axis 19 is chosen to correspond to a particular waveband of radiation which the waveguide 18 positioned therein is arranged to guide.

The mount 15 is disposed upon a translation stage 20 which permits controlled movement of the waveguides 18 disposed thereon. In particular, the stage 20 enables controlled movements of the waveguides 18 in the three orthogonal x, y and z directions. It also allows controlled rotational movements to vary the pitch, roll and yaw movements of the waveguides 18. In the illustrated embodiment, the channels 17 of the mount 15 are arranged to receive three optical fibres 18a-c for collectively transmitting a broad span of lasing wavelengths from 355 nm to 4600 nm. The fibres 18a-c comprise single mode fibres for the particular wavelength of radiation which they are arranged to guide.

Referring to FIG. 4 of the drawings, there is shown a method 100 of co-aligning the radiation from the radiation sources 12a-c. Accordingly, when combining and co-aligning the radiation from each fibre 18a-c in accordance with the method, at step 1 each fibre 18a-c is separately lowered into the respective channel 17 and is separately moved longitudinally of the channel 17 and parallel to the optical axis 19 of the collimator element 13. This movement positions the output end 21a-c of each fibre 18a-c at the focal length of the collimator element 13 for that wavelength. At step 102, each fibre 18a-c is subsequently fixed in position using a drop of epoxy (not shown), for example, so that the next fibre 18b (for example) can be located at the correct position without changing the position of the first fibre (18a, for example). At step 103, when each fibre 18a-c has been suitably positioned, a lid 22 is positioned on top of the mount 15 to clamp the fibres 18a-c within the channels 17.

The benefit of positioning the fibres 18a-c in this way is illustrated in FIG. 5 of the drawings which shows the effect on the far-field beam profile at 355 nm of translating the fibre away from the correct focal point. FIG. 5(b) illustrates the de-focussed version of the image caused by longitudinally displacing the output of the fibre by 300 μm, resulting in a highly aberrated beam. In an alternative embodiment which is not illustrated, the output of the fibres 18a-c may be suitably positioned using active monitoring. During this process, the radiation having the relevant waveband may be transmitted through the fibres 18a-c, while the longitudinal position of the output 21a-c of the fibres 18a-c are positioned in order to fix the fibre position once the precise focal point has been reached or when geometric aberrations are minimised.

At step 104, the radiation which exits the fibres 18a-c is subsequently collimated by the collimator element 13, such as a lens, and directed onto the combining element 14 at the correct angle and at a common position thereon, such that, at step 5, the radiation departing the combining element 14 becomes co-aligned. From the foregoing, therefore, it is evident that the apparatus and method of co-aligning laterally displaced radiation beams provide for an improved beam quality of the combined beam and thus for a more efficient combination of the power associated with the separated radiation beams.

The invention claimed is:

1. An apparatus for co-aligning a number of laterally displaced radiation beams from respective radiation source outputs, each beam having a respective waveband, the apparatus comprising:

a collimating element for receiving each of said radiation beams with respective lateral displacements;

a combining element for receiving each of said radiation beams passed by said collimating element; and a radiation source mount for positioning the radiation source outputs relative to the collimating element;

wherein the radiation source outputs are longitudinally positionable upon the mount relative to the collimating element in dependence upon the waveband of each beam to cause the radiation beams passed by the combining element to be co-aligned, wherein the radiation source mount is arranged to support a number of waveguides, each being arranged to guide a different wavelength of radiation from a respective radiation source, wherein each waveguide includes an output end located at a different distance from the collimating element, the distance being based upon each of the different wavelengths being guided in each respective waveguide, and wherein the radiation source mount comprises a translation stage for longitudinally displacing the radiation source outputs from the collimating element.

2. The apparatus according to claim 1, wherein the radiation source mount comprises a number of longitudinal channels disposed therein, each for separately receiving one of the waveguides.

3. The apparatus according to claim 2, wherein the channels are orientated substantially parallel to each other and to an optical axis of the collimating element.

4. The apparatus according to claim 3, wherein the relative lateral separation of the channels within the radiation source mount from the optical axis of the collimating element is based on the waveband of the respective radiation source.

5. The apparatus according to claim 2, wherein the radiation source mount further comprises a clamp for clamping the waveguides within their respective channels.

6. The apparatus according to claim 1, wherein the collimating element comprises a lens or a lens arrangement.

7. The apparatus according to claim 1, wherein the combining element comprises a diffraction grating or a prism.

8. A method of co-aligning a number of laterally displaced radiation beams output from respective radiation sources, each beam having a respective waveband, the method comprising:

longitudinally positioning the output of the radiation sources upon a mount relative to a collimating element, in dependence upon the waveband of the respective beam;

collimating the radiation beams output from the radiation sources at the collimating element; and combining the collimated radiation beams at a combining element, such that the radiation beams passed by the combining element become co-aligned, wherein the radiation source outputs are longitudinally positionable upon the mount relative to the collimating element in dependence upon the waveband of each beam, wherein the mount is arranged to support a number of waveguides, each being arranged to guide a different wavelength of radiation from a respective radiation source, wherein each waveguide includes an output end located at a different distance from the collimating element, the distance being based upon each of the different wavelengths being guided in each respective waveguide, and wherein the mount comprises a translation stage for longitudinally displacing the radiation source outputs from the collimating element.

9. The method according to claim 8, further comprising fixing the position of the output of the radiation sources once the beams passed by the combining element become co-aligned.

10. The A method according to claim 8, wherein the mount comprises a number of longitudinal channels disposed therein, each for separately receiving one of the waveguides.

11. The method according to claim 10, wherein the channels are orientated substantially parallel to each other and to an optical axis of the collimating element.

12. The method according to claim 11, wherein the relative lateral separation of the channels within the radiation source mount from the optical axis of the collimating element is based on the waveband of the respective radiation source.

13. An apparatus for co-aligning a number of laterally displaced radiation beams from respective radiation source outputs, each beam having a respective waveband, the apparatus comprising:

a collimating element for receiving each of said radiation beams with respective lateral displacements, wherein the collimating element comprises a lens or a lens arrangement;

a combining element for receiving each of said radiation beams passed by said collimating element, wherein the combining element comprises a diffraction grating or a prism; and a radiation source mount for positioning the radiation source outputs relative to the collimating element, wherein the radiation source mount comprises a translation stage for longitudinally displacing the radiation source outputs from the collimating element;

wherein the radiation source outputs are longitudinally positionable upon the mount relative to the collimating element in dependence upon the waveband of each beam, such that each radiation source output is in a different longitudinal position relative to the other radiation source outputs, to cause the radiation beams passed by the combining element to be co-aligned.

14. The apparatus according to claim 13, wherein the radiation source mount is arranged to support a number of waveguides, each being arranged to guide radiation from a respective radiation source.

15. The apparatus according to claim 14, wherein the radiation source mount comprises a number of longitudinal channels disposed therein, each for separately receiving one of the waveguides.

16. The apparatus according to claim 15, wherein the channels are orientated substantially parallel to each other and to an optical axis of the collimating element, and wherein the relative lateral separation of the channels within the radiation source mount from the optical axis of the collimating element is based on the waveband of the respective radiation source.

17. The apparatus according to claim 15, wherein the radiation source mount further comprises a lid for clamping the waveguides within their respective channels.

\* \* \* \* \*